United States Patent Office 2,947,722
Patented Aug. 2, 1960

2,947,722

STABILIZED POLYMERIC OXETANE MOLDING COMPOSITIONS

Harold Boardman, Wilmington, Del., assignor to Hercules Powder Company, Wilmington, Del., a corporation of Delaware No Drawing. Filed Aug. 17, 1954, Ser. No. 450,533

8 Claims. (Cl. 260—45.85)

This invention relates to new plastic compositions suitable for molding and other plastic uses and, more particularly, to stabilized polymers of 3,3-bis(chloromethyl)oxetane, which polymers retain their viscosity on exposure to heat, light, and other degrading influences.

Polymers of 3,3-bis(chloromethyl)oxetane having a molecular weight of at least 10,000 have physical properties which are highly desirable for the preparation of molded articles such as tubing, pipes, pipe fittings, gears, etc., as well as the many molded articles that may be prepared from other plastic compositions. While these polymers have a high degree of heat stability, they are subject to degradation when heated for long periods of time. Thus, while it is possible to produce molded or coated articles on a small or laboratory scale, for such articles to be produced on a commercial scale, the polymer must be maintained for extended periods of time at a temperature well above its melting point and usually in contact with oxygen, which frequently results in a considerable degradation of the polymer. Also, if the article is one that will be subjected to constant heat as in chemical reactors, piping for hot liquids, articles that require sterilization, etc., degradation of the polymer may occur resulting in the article becoming brittle. Another type of degradation that may be encountered is that caused by exposure for long periods of time to light and particularly to ultraviolet light, as may be the case in many applications of these polymers, with the result that a considerable amount of discoloration may occur as well as loss in flexibility.

Now, in accordance with this invention, it has been found that the degradation of the polymers of 3,3-bis(chloromethyl)oxetane by heat, light, etc., may be prevented by the incorporation of a stabilizer for the 3,3-bis(chloromethyl)oxetane polymer in the composition prior to the fabrication of molded articles, used as a coating in laminated compositions, etc. Compositions comprising 3,3-bis(chloromethyl)oxetane polymers having a molecular weight of at least 10,000, and preferably having a molecular weight such that the specific viscosity of a 1% solution of the polymer in cyclohexanone at 50° C. is at least 0.3 in combination with a phenolic stabilizer, are not subject to such polymer degradation and hence retain their flexibility, impact strength, tensile strength, etc. Such stabilized 3,3-bis(chloromethyl)-oxetane polymers are of outstanding utility for the preparation of molded articles, coatings, etc., where high chemical resistance, flame resistance, resistance to organic solvents, water, etc., are desired. One of the advantages of these stabilized compositions is that the articles prepared from them have a high degree of flexibility without the necessity of incorporating a plasticizer and hence are not subject to the many disadvantages inherent in the use of a plasticizer, such as migration, extraction, etc., of the plasticizer. On the other hand, the use of plasticizers is not precluded and may be desired to obtain an even greater degree of flexibility, particularly where a high order of shock resistance is required.

Any polymer of 3,3-bis(chloromethyl)oxetane, which may also be called 3,3-bis(chloromethyl)oxacyclobutane, having a molecular weight of at least 10,000 may be stabilized in accordance with this invention to produce compositions suitable for molding, coating, etc. However, the higher the molecular weight of the polymer, the better the general physical properties. Hence, higher molecular weight polymers are generally preferred for the plastic compositions of this invention. Because the molecular weight of the higher molecular weight polymers is not as easily or accurately determined, it is simpler to define the most useful polymers in terms of their specific viscosities. Polymers having a specific viscosity, when measured as a 1% solution in cyclohexanone at 50° C., of at least about 0.3 are useful for the compositions of this invention and, preferably, the polymers used will have a specific viscosity (1% solution in cyclohexanone at 50° C.) of at least about 0.5 and more preferably from about 0.8 to 3 or above.

The 3,3-bis(chloromethyl)oxetane polymers having molecular weights of 10,000 and above may be prepared by contacting 3,3-bis(chloromethyl)oxetane with boron trifluoride or its molecular complexes. The polymerization reaction is generally carried out in the presence of an inert organic liquid diluent. Any inert organic solvent may be used as the diluent for the polymerization. However, highly polar organic solvents such as dioxane, etc., are preferably not used since they retard the polymerization by inactivating the catalyst. In addition, inorganic solvents such as liquid sulfur dioxide may also be used. The solvent should, of course, not be one which will cause chain termination since such a solvent, as, for example, an alcohol, would not then be inert. Exemplary of the solvents which may be used for carrying out the polymerization of 3,3-bis(chloromethyl)-oxetane are the hydrocarbon solvents such as n-hexane, cyclohexane, benzene, toluene, etc., chlorinated solvents such as methylene chloride, chloroform, carbon tetrachloride, dichlorobenzene, etc., and nitro compounds such as nitropropane, nitrobenzene, etc. The catalyst may be added directly to the solution of 3,3-bis(chloromethyl)oxetane in inert diluent or it may be added as a solution, if desired. Boron trifluoride may be added as a gas or if used in the form of one of its molecular complexes with an ether, acid, or salt, as, for example, boron trifluoride etherate, etc., it may be added as a solution. The amount of catalyst which is added to the monomer may vary over a wide range but usually from about 0.01% to about 10% is adequate and preferably an amount of from about 0.1% to about 4% based on the monomer will be used. The amount of catalyst will, of course, vary with the type of polymerization reaction. For example, a lower range of catalyst concentration is required if the polymerization is carried out in the absence of a solvent and a higher concentration of catalyst is used if the polymerization is carried out in the presence of a diluent.

The temperature at which the polymerization of 3,3-bis(chloromethyl)oxetane is carried out may vary over a wide range and is, in general, dependent upon the solvent used, etc. In general, the molecular weight of the polymer produced increases with a decrease in temperature. Hence, for the production of higher molecular weight polymers, the temperature should be held below about 80° C. Lowering of the temperature is limited by the type of solvent and the solvent-monomer ratio employed in the reaction since the monomer may tend to crystallize out of solution and hence reduce the rate of polymerization. In general, the polymerization reaction will be carried out, by selection of appropriate solvent, etc., at a temperature within the range of from about —80° C. to about 80° C., preferably at a temperature below about 30° C. and more preferably at a temperature below about 20° C. The length of time that the polymerization reaction is carried out will, in general, vary from about ½ hour to 10 hours. Although the reaction mixture may turn solid very quickly, higher conversions may be obtained by allowing it to "cure" for several hours, the polymerization continuing in what is apparently a solid phase. The polymerization reaction may, of course, be performed in a batchwise manner or as a continuous reaction.

The manner in which the polymer is isolated will depend upon the type of polymerization system used. For example, if a large amount of solvent was used as a diluent, the polymer may be separated simply by filtration. Otherwise, it is readily isolated by treating the reaction mixture with a liquid in which the polymer is insoluble but which will destroy the catalyst which was used for the polymerization reaction. Alcohols such as methanol, ethanol, isopropanol, etc., are suitable for this purpose. The polymer then may be separated by filtration.

Polymers of 3,3-bis(chloromethyl)oxetane of any desired molecular weight may be prepared by the proper selection of the polymerization reaction conditions, as, for example, control of temperature, etc. Another factor which enters into the molecular weight of the polymer obtained by this polymerization process is the purity of the monomer. As pointed out above, alcohols function as chain terminators in the polymerization reaction. Hence, if the monomer contains as an impurity any appreciable amount of chlorohydrin, the molecular weight of the polymer which is produced will be lowered. In the same way, the presence of alcohols, in general, and of any substantial amount of moisture should be avoided since they terminate the polymerization and also destroy the catalyst.

Another method of modifying the properties of the 3,3-bis(chloromethyl)oxetane polymer is by the incorporation of a copolymerizable monomer in the polymerization mixture so that a copolymer is produced. By this means it is often possible to modify the physical properties of the polymer in a desired manner for a specific use of the 3,3-bis(chloromethyl)oxetane polymer. For example, the softening point may be raised or lowered, flexibility increased, etc. Exemplary of the monomers that may be copolymerized with 3,3-bis(chloromethyl)oxetane are other 3,3-disubstituted oxetanes such as 3,3-bis(fluoromethyl)oxetane, 3,3-bis(bromomethyl)oxetane, 3-chloromethyl-3-methyloxetane, 3,3-dimethyloxetane, 3,3-bis(phenoxymethyl)oxetane, etc., and other copolymerizable monomers such as oxetane, and other substituted oxetanes.

The following examples will illustrate the preparation of the polymers of 3,3-bis(chloromethyl)oxetane from which the compositions of this invention are prepared. All parts and percentages are by weight unless otherwise indicated.

*Example 1*

A solution of 1 part of 3,3-bis(chloromethyl)oxetane in 1 part of methylene chloride was treated at 0° C. with 2.0% of boron trifluoride based on the monomer (added as a 25% solution of boron trifluoride etherate in methylene chloride). After standing for 5–7 hours at that temperature, methanol was added to the reaction mixture and the polymer separated by filtration. The conversion of monomer to polymer amounted to 80%. This polymer had a specific viscosity (1% solution in cyclohexanone) of 0.375. This corresponds to a molecular weight of 26,000.

A sample of this polymer, mixed with 0.2% of 2,2'-methylenebis(4-methyl-6-tert-butylphenol), was heated at its melting point for 5 hours in oxygen and found to be stable. There was no degradation of the polymer, decrease in molecular weight, or loss of chlorine.

*Example 2*

A solution of 1 part of 3,3-bis(chloromethyl)oxetane in 2 parts of chloroform was cooled to —35° C. and held at that temperature while a slow stream of nitrogen was passed through it, boron trifluoride being bled into the nitrogen stream at such a rate that the temperature elevation was maintained within one to two degrees. Within one-half hour the reaction mixture had become so viscous that it could no longer be stirred. It was then allowed to stand at —35° C. for 2 hours, after which the polymer was recovered by agitating the reaction mixture with methanol and filtering. The polymer was washed with methanol and dried in vacuo at 60° C. The white solid product so obtained had a softening point of 165–170° C. The specific viscosity of a 1% solution of it in cyclohexanone was 0.702 which corresponds to a molecular weight of about 42,000. A molded sample of the polymer was flexible and did not turn brittle even on heat-treatment at 80° C.

*Example 3*

The above example was repeated except that methylene chloride was used in place of chloroform and the temperature was held at —50° C. throughout the polymerization. The polymer so obtained had a softening point of about 165–170° C. and an intrinsic viscosity of 1.05 which is equivalent to a molecular weight of about 60,000 to 100,000. A molded specimen of this polymer had a tensile strength of 5,600 p.s.i., a flex strength of 11,000 p.s.i., and impact strength (Izod) of 0.7 ft. lb./in. of notch.

*Example 4*

A solution of 1 part of 3,3-bis(chloromethyl)oxetane in 2 parts of methylene chloride was cooled to —50° C. and held at that temperature while a slow stream of nitrogen was passed through it, boron trifluoride being bled into the nitrogen stream at such a rate as to maintain the temperature within one to two degrees. The total amount of boron trifluoride used was 0.7% based on the weight of the monomer. At the end of 4 hours, the polymer was isolated as described in the above examples. The specific viscosity of a 1% solution of this polymer in cyclohexanone at 50° C. was 1.6.

*Example 5*

A solution of 1 part of freshly distilled 3,3-bis(chloromethyl)oxetane in 2 parts of methylene chloride was cooled to about —45° C. Boron trifluoride was bled into this solution as described in the foregoing examples until an amount of about 2.0% of boron trifluoride based on the weight of the monomer had been added. After 1½ hours the polymer was isolated. The conversion of monomer to polymer amounted to 74%. A 1% solution of this polymer in cyclohexanone at 50° C. had a specific viscosity of 2.3.

*Example 6*

A solution of 1 part of a carefully purified 3,3-bis(chloromethyl)oxetane in 2 parts of methylene chloride was cooled to —50° C. Boron trifluoride (1.0% based on the weight of the monomer) was then added as in the foregoing examples. After 1 hour the polymer was isolated. The specific viscosity of this polymer (1% solution in cyclohexanone at 50° C.) was 3.7.

*Example 7*

To a solution of 5.2 parts of 3,3-bis(chloromethyl)oxetane and 2.38 parts of 3,3-bis(fluoromethyl)oxetane in 14 parts of liquid sulfur dioxide cooled to —25° C. was added 0.12 part of gaseous boron trifluoride. After standing for 18 hours at that temperature, methanol was added and the polymer was separated by filtration, washed with methanol, and dried. The polymer obtained was a tough solid that softened at 110° C. and had a specific viscosity of 0.658 when measured as a 1% solution in cyclohexanone. It contained 29.2% chlorine and 11.1% fluorine.

*Example 8*

A mixture of 5.2 parts of 3,3-bis(chloromethyl)oxetane and 3.98 parts of 3,3-bis(bromomethyl)oxetane was polymerized as described in Example 7. The polymer so obtained was a powder having a melting point of 179–185° C. and a specific viscosity of 0.316 when measured as a 1% solution in cyclohexanone. It contained 26.6% chlorine and 26.9% bromine.

*Example 9*

A slow stream of nitrogen was passed into an agitated solution of 117 parts of 3,3-bis(chloromethyl)oxetane and 12 parts of 3-chloromethyl-3-methyloxetane. After cooling to −30° C., 3.88 parts of gaseous boron trifluoride was introduced into the nitrogen stream. Polymerization was then allowed to proceed at that temperature for 4 hours after which 300 parts of methanol was added. The polymer was removed by filtration, washed with methanol, and dried. It was a powder having a melting point of 152–156° C. and a specific viscosity of 1.217 when measured as a 1% solution in cyclohexanone. It contained 43.6% chlorine.

*Example 10*

A slow stream of nitrogen was passed into a solution of 7.3 parts of dimethyloxetane and 95 parts of 3,3-bis-(chloromethyl)-oxetane in 210 parts of liquid sulfur dioxide and cooled to −30° C. Gaseous boron trifluoride, 3 parts, was then added and the polymerization was allowed to proceed at that temperature for 5 hours. Methanol, 300 parts, was then added and the polymer was separated by filtration, washed with methanol, and dried. It was a powder having a melting point of 159–163° C. and a specific viscosity of 0.999 when measured as a 1% solution in cyclohexanone. It contained 42.0% chlorine.

In accordance with this invention, polymers of 3,3-bis-(chloromethyl)oxetane, either homopolymers or copolymers, may be stabilized against degradation and the consequent loss in viscosity encountered on heating the polymer by the incorporation of a small amount of a phenolic stabilizer. Any phenolic stabilizer or ester or ether thereof may be used in the preparation of the compositions of this invention. Some of these phenolic compounds or esters or ethers thereof are more effective as heat stabilizers while others are more effective as light stabilizers although in many instances the compound will act as both. It may, therefore, be desirable to use more than one of the phenolic stabilizers. While any phenol will exert some stabilization, the phenol will preferably contain at least one alkyl or cycloalkyl substitutent, having at least 4 carbon atoms, or aryl substituent, or aralkyl substituent. Exemplary of the phenols, phenol esters, and phenol ethers that may be used as heat and/or light stabilizers for the polymers of 3,3-bis(chloromethyl)-oxetane are the highly substituted phenols such as di-tert-butyl p-cresol, o,p-diamylphenol, o- and p-tert-amyl-phenol, p-octylphenol, benzoyl resorcinol (i.e., 2,4-dihydroxybenzophenone), p-cyclohexylphenol and the similarly substituted alkyl naphthols, etc., alkylenebisphenols such as 2,2-methylenebis(4-methyl-6-tert-butylphenol), 2,6-bis[(2-hydroxy-5-methylphenyl)methyl]-p-cresol, p,p′-isopropylidenebisphenol, p,p′-sec-butylidenebisphenol, 4,4′-isopropylidene-bis-o-cresol, etc., esters of phenols such as resorcinol monobenzoate, hydroquinone monobenzoate, propyl gallate, etc., and ethers of phenols such as the monobenzyl ether of hydroquinone, and the epoxy resins produced by the reaction of epichlorohydrin with various bisphenols such as p,p′-isopropylidenebisphenol, p,p′- sec-butylidenebisphenol, 4,4′-isopropylidene-bis-o-cresol, etc.

The amount of the phenolic stabilizer that is incorporated in the composition for plastic uses may be varied over a wide range and will depend upon the degree of stabilization desired, but, in general, an amount of from about 0.1% to about 10%, and preferably from about 1 to about 5% by weight of the polymer of these phenolic stabilizers will adequately protect the fabricated articles from the degrading effects of heat, light, etc. A larger amount of stabilizer may be used if desired, but generally is not necessary. Also effective as light stabilizers for the fabricated articles prepared from the compositions of this invention are inert materials such as fillers, pigments, etc. While these materials do not act as stabilizers during fabrication, they are effective ultraviolet light screens for the finished articles.

Various other additives may be incorporated in the plastic compositions of this invention. For many purposes it may be desirable to incorporate various fillers, pigments, or other colorants, etc., not only as ultraviolet light screens but for coloring, or to make less expensive plastic compositions by extending them with inert fillers. The amount of such materials which are added to the plastic compositions of this invention may, of course, be varied over a wide range. For example, titanium dioxide has been incorporated in a polymer having a specific viscosity of 1.7 (1% solution in cyclohexanone at 50° C.) up to an amount of 50% by weight of the polymer and the molded article prepared from such a composition. Any of the other fillers frequently used in plastic compositions, as, for example, calcium carbonate, wood flour, etc., may likewise be used in the plastic compositions of this invention. For the preparation of colored materials, the amount of pigment, or other colorant such as dyes, added will obviously depend upon the degree or shade of color desired.

For some purposes it may be desirable to incorporate a plasticizer in the plastic compositions of this invention. Many of the phenolic stabilizers mentioned above will also function as plasticizers for the compositions of this invention if used in a sufficient quantity, as, for example, when used in an amount of from about 5 to about 10% of the polymer weight. Other plasticizers that may also be used for incorporation in the compositions of this invention are the alkyl esters of carboxylic acids such as the alkyl stearates, oleates, sebacates, adipates, phthalates, etc., as for example, amyl stearate, butyl oleate, di-2-ethylhexyl adipate, dibutyl sebacate, dioctyl phthalate, di-2-ethylhexyl phthalate, n-octyl n-decyl phthalate, glycerol triacetate, glycerol tripropionate, pentaerythritol diacetate dibutyrate, dipentaerythritol diacetate dipropionate dibutyrate, and the pentaerythritol tetraester of mixed $C_4$ to $C_9$ acids, polyesters such as the polyester of sebacic acid and ethylene glycol, phosphates such as tricresyl phosphate, cresyl diphenyl phosphate, 2-ethylhexyl diphenyl phosphate, hydrocarbon oils such as mineral oil, fluorinated chlorinated hydrocarbon oils, chlorinated diphenyl, o-chloronaphthalene, polyethers such as the solid polyethylene glycols sold under the trade name, Carbowax, and other polymeric materials such as styrene-acrylonitrile copolymers, polydimethyloxetane (polymerized 3,3-dimethyloxetane), etc.

The new plastic compositions of this invention comprising a polymer of 3,3-bis(chloromethyl)oxetane and a stabilizer therefor have a wide variety of applications. Among the many advantages of the compositions of this invention for the preparation of molded and extruded thermoplastics are their excellent chemical resistance including water resistance and resistance to organic solvents, retention of strength at elevated temperatures, excellent physical strength, especially unnotched impact strength, excellent electrical properties, and outstanding dimensional stability. These compositions are of particular utility for the manufacture of extruded pipes and rigid and flexible tubing, injection-molded pipe fittings, bottle and tube caps, jar lids, buttons, combs, dinnerware and kitchen utensils, parts for household appliances, textile machinery parts, electrical equipment parts, gears, gaskets, squeeze bottles and jars, etc.

Any of the molding processes used for molding thermoplastic materials may be used for molding the plastic molding compositions of this invention. They may be molded by compression-molding, transfer-molding, slush-molding or splash-molding processes. These compositions are particularly advantageous because they may be injection-molded which is the process most desirable commercially. In the case of the compositions of this invention, the injection-molding process produces a molded article having a molecularly oriented "skin" or "layer." This oriented surface film greatly increases the toughness and impact resistance of the article by a factor of 15–20 times. This has been demonstrated by testing an injection-molded strip ½ inch thick by the Izod impact strength test. When cut or notched 0.1 inch, it required 0.5 ft. lb./inch of notch to break, whereas if unnotched, it takes 15–20 ft. lb./inch to break.

The compositions of this invention may also be used for coating or laminating, etc., where chemical resistance is desired. Coatings of these compositions may be applied from solution in a solvent for the composition, as, for example, cyclohexanone, by hot-brushing, spreading by means of a blade, or spraying of the composition in molten form, etc. Laminates may be prepared by building up the layers by means of a solution of the polymer or by molten polymer. They may also be formed by fusing layers of dry polymer between the material to be laminated. In any case, the coatings and laminates should be fused on the substrate by baking, as, for example, at a temperature of about 204° C. for 3–10 minutes, or by flash-fusing, as with a flame, etc. This fusing will remove the solvent, if used, provide better transparency, and yield an even, glossy surface. It also improves the adhesion of the coatings to the substrate. These coatings will adhere to paper, metal, glass, etc. Hence paper cartons may be made water- and solvent-proof or shatterproof glass may be prepared, etc., excellent fire-resistant insulating materials may be prepared by using these compositions for binding glass fibers, etc. Many other applications for the compositions of this invention will, of course, occur to those skilled in the art.

The following examples will illustrate the fabrication of molded articles, coated materials, laminates, etc., from the compositions of this invention.

Example 11

A 3,3-bis(chloromethyl)oxetane polymer having a specific viscosity of 1.7 (1% solution in cyclohexanone, measured at 50° C.) was slurried with an acetone solution of 2,2-methylenebis(4-methyl-6-tert-butylphenol) in the proportion of 0.5 part of the phenol to 100 parts of polymer. The acetone was evaporated by allowing the composition to dry overnight at room temperature and atmospheric pressure, followed by 2 hours at 60° C. and 29 inches of vacuum. The dried, finely divided material was then extruded into a ribbon about ½ inch wide and ⅛ inch thick by means of a conventional screw-type plastics extruder. The cylinder temperature was 218° C. The ribbon was subsequently chopped into pellets suitable for use in an injection-molding machine.

The pellets were injection-molded into various articles such as dumbbell-shaped tensile test specimens, bars ¼ x ½ x 2½ inches, and discs ½ inch thick and 2 inches in diameter. The molding conditions were: cylinder and nozzle temperatures 227–238° C., pressure 6000–7500 p.s.i., and cycle time 50 seconds.

The molded articles thus prepared were found to have a tensile strength of 6200 p.s.i., ultimate elongation of 48%, Izod impact strength of 0.46 ft. lb./inch of notch, Rockwell hardness of 102 (R scale), water absorption of 0.01%, and were very resistant to attack by a wide variety of acids, bases, and organic solvents.

Examples 12 and 13

Mixtures of the 3,3-bis(chloromethyl)oxetane polymer used in Example 11 with 2% of 2,6-bis(2-hydroxy-5-methylphenyl)methyl-p-cresol and with 2% of a commercial epoxy resin (a reaction product of epichlorohydrin and p,p'-isopropylidenebisphenol) sold under the name of Epon RN–34 by Shell Chemical Company, were prepared and extruded as in Example 7. There was no change in color or degradation of the polymer in either case during the molding process and the molded articles so obtained had essentially the same physical properties as those in Example 11.

Example 14

A mixture of a 3,3-bis(chloromethyl)oxetane polymer having a specific viscosity of 1.4 (1% solution in cyclohexanone at 50° C.), 0.5% based on the weight of the polymer of 2,2-methylenebis(4-methyl-6-tert-butylphenol), and 3.5% of a commercial epoxy resin (a reaction product of epichlorohydrin and p,p'-isopropylidenebisphenol) sold by Carbide and Carbon Chemical Company under the name of Stabilizer A–5, was prepared and injection-molded. The molded articles so prepared had a tensile strength of 5800 p.s.i., a tensile modulus of 130,000 p.s.i., ultimate elongation of 80%, Izod impact strength of 0.43 ft. lb./inch of notch, Rockwell hardness of 97 (R scale), and water absorption of 0.01%.

Example 15

The same polymer-stabilizer composition described in Example 11 was extruded from a 1-inch screw-type extruder fitted with a tubing die, the cylinder being maintained at 232° C. The tubing was taken from the die by means of a continuous belt at a rate just fast enough to prevent sagging of the tubing after leaving the die (5 inches per minute). On cooling and hardening, a tubing of about ⅜ inch outside diameter was obtained, said tubing being translucent, rather rigid and tough. A more flexible, tougher material was obtained by drawing the tubing away from the die at 2 feet per minute, yielding a tubing of approximately 3/16 inch outside diameter.

Example 16

To demonstrate the utility of the plastic molding compositions of this invention for the preparation of "squeeze bottles," prepared commercially by injection-molding or blown from tubing, a bottle was fabricated by hand. A solution consisting of 20% by weight of the polymer-stabilizer composition used in Example 11 in cyclohexanone was maintained at approximately 70° C., and a small glass Florence flask, 2¼ inches in diameter, was dipped into the hot solution. The coating thus imparted to the glass was dried at 155° C. for 40 minutes. This dipping and drying procedure was repeated three times. Finally, the assembly was placed in an oven at 204° C. for 3 minutes. It was then quenched immediately in cold water and the glass form was broken and removed. The colorless, transparent bottle thus formed was quite flexible and had a wall thickness of 0.006 to 0.007 inch.

Example 17

A 15% solution of a 3,3-bis(chloromethyl)oxetane polymer having a specific viscosity of 1.7 (1% in cyclohexanone at 50° C.) and containing 0.5% of 2,2-methylenebis(4-methyl-6-tert-butylphenol) in hot cyclohexanone was cast with a doctor blade on a panel of bonderized steel, dried at 100° C., and subsequently fused for 10 minutes at 204° C. A coating 0.0015 inch in thickness was thus obtained. When the panel was bent over a tapered mandrel, there was no damage to the polymer coating.

Coatings of this same polymer solution were applied in the same way to glass, chromium-plated steel, and paper with equally excellent results.

*Example 18*

Laminated compositions of alternate layers of glass fibers and the polymer-stabilizer composition described in Example 11 were prepared by three different techniques.

(a) *Solution method.*—A hot cyclohexanone solution containing 22% of the stabilized polymer composition was poured over a mat of glass fibers, then a second mat was placed on top. The procedure was repeated until five layers of glass were built up. The assembly was clamped between two blocks of wood tnd dried for one hour at 100° C. It was then fused at 204° C. for 10 minutes.

(b) *Hot melt method.*—The molten polymer composition was extruded as a ½ inch ribbon at cylinder temperature of 260° C. onto small glass fiber mats, alternating glass and polymer until five layers of glass were present. The assembly was immediately clamped between blocks of wood and allowed to cool.

(c) *Dry polymer hot pressed.*—A laminate built up of alternate layers of glass fiber, approximately 3 inches square, and dry, powdered stabilized polymer composition was placed between chromium-plated steel sheets on the lower platen of an electrically heated, hydraulic press. The upper platen was brought into light contact with the upper steel sheet and the polymer was allowed to fuse for 3–5 minutes at platen temperature of 220° C. The assembly was then compressed at about 110 p.s.i. and allowed to cool under pressure.

In all of the above cases a hard, strong laminate was obtained.

*Examples 19–22*

In each of these examples, 210 parts of a finely divided polymer of 3,3-bis(chloromethyl)oxetane having a specific viscosity of 1.3 (1% solution in cyclohexanone at 50° C.) containing 0.5% of 2,2-methylenebis(4-methyl-6-tert-butylphenol) was mixed with a solution of 90 parts of the plasticizer dissolved in 115 parts of acetone. The polymer parts were wet and thoroughly mixed with the acetone solution, after which the acetone was removed by evaporation and finally by drying in vacuo at 60–70° C. for 4 hours. Each of the polymer mixtures was then injection-molded and the flexural modulus and brittle temperature were determined with the following results:

| Example | Plasticizer | Molding Temperature, °C. | Flexural Modulus | Brittle Temperature, °C. |
| --- | --- | --- | --- | --- |
| 19 | n-Octyl decyl phthalate | 155 | 33,000 | −15 |
| 20 | Mineral oil | 150 | 32,000 | −15 |
| 21 | Pentaerythritol tetraester of mixed $C_4$–$C_9$ acids | 150 | 22,000 | −15 |
| 22 | Dibutyl sebacate | 145 | 5,000 | −37 |

*Examples 23 and 24*

The copolymers prepared as described in Examples 9 and 10 were each admixed with 0.5% of 2,2-methylenebis(4-methyl-6-tert-butylphenol) and then injection-molded. The molded specimen prepared from the copolymer of 3,3-bis(chloromethyl)oxetane and 3-chloromethyl-3-methyloxetane had a flexural modulus of 94,000 and Rockwell hardness of 82 (R scale). The molded specimen prepared from the copolymer of 3,3-bis(chloromethyl)oxetane and 3,3-dimethyloxetane had a flexural modulus of 49,000 and Rockwell hardness of 58 (R scale). Both of these copolymers had a lower rigidity at a given temperature than that of a homopolymer of 3,3-bis(chloromethyl)oxetane, the 3-chloromethyl-3-methyloxetane copolymer having the same apparent modulus of rigidity (Clash and Berg test) at a temperature of 12° (C.) lower and the 3,3-dimethyloxetane copolymer at a temperature of 20° (C.) lower.

*Example 25*

A polymer of 3,3-bis(chloromethyl)oxetane having a specific viscosity of 1.3 (measured as a 1% solution in cyclohexanone) was mixed with 0.5% of 2,2-methylenebis(4-methyl-6-tert-butylphenol). To one portion of this mixture was then added, as a plasticizer, 5% of a polymer of 3-chloromethyl-3-methyloxetane, having a specific viscosity of 1.2 when measured as a 1% solution in cyclohexanone, and to another portion was added 20% of this polymer. Each of these mixtures was then injection-molded. The molded specimen prepared from the mixture containing 5% of the plasticizing polymer had a flexural modulus of 110,000 and Rockwell hardness of 91 and that from the mixture containing 20% of the plasticizing polymer had a flexural modulus of 65,000 and Rockwell hardness of 65.

The above examples have demonstrated the wide utility of the plastic molding compositions of this invention. Obviously many variations in the fabrication of molded articles from these compositions will be apparent to those skilled in the art.

This application is a continuation-in-part of my application Serial No. 367,718, filed July 13, 1953, and now abandoned, which is, in turn, a continuation-in-part of my application Serial No. 294,049, filed June 17, 1952.

What I claim and desire to protect by Letters Patent is:

1. As a new article of manufacture, a pelleted plastic molding composition essentially consisting of a mixture of a polymer of the group consisting of homopolymers of 3,3-bis(chloromethyl)oxetane and copolymers of 3,3-bis(chloromethyl)oxetane with at least one member of the group consisting of 3,3-disubstituted oxetanes other than 3,3-bis(chloromethyl)oxetane and oxetane, and a phenolic compound of the group consisting of phenols, esters of said phenols, and ethers of said phenols in an amount from about 0.1% to about 10% by weight of said polymer as a heat and light stabilizer therefor, said phenols having at least one substituent radical of the group consisting of alkyl radicals having at least 4 carbon atoms, aryl radicals, and aralkyl radicals, said polymer having a specific viscosity of at least about 0.3 when mesured as a 1% solution in cyclohexanone at 50° C.

2. As a new article of manufacture, a pelleted plastic molding composition in accordance with claim 1 in which said polymer has a specific viscosity of at least about 0.5 when measured as a 1% solution in cyclohexanone at 50° C.

3. As a new article of manufacture, a pelleted plastic molding composition in accordance with claim 1 in which said polymer has a specific viscosity of from about 0.8 to about 3 when measured as a 1% solution in cyclohexanone at 50° C.

4. As a new article of manufacture, a pelleted plastic molding composition essentially consisting of a mixture of a polymer of the group consisting of homopolymers of 3,3-bis(chloromethyl)oxetane and copolymers of 3,3-bis(chloromethyl)oxetane with at least one member of the group consisting of 3,3-disubstituted oxetanes other than 3,3-bis(chloromethyl)oxetane and oxetane, and from about 0.1% to about 10% by weight, based on said polymer, of 2,2-methylenebis(4-methyl-6-tertiary butylphenol) as a heat and light stabilizer therefor, said polymer having a specific viscosity of at least about 0.3 when measured as a 1% solution in cyclohexanone at 50° C.

5. As a new article of manufacture, a pelleted molding powder composition essentially consisting of a mixture of a polymer of the group consisting of homopolymers of 3,3-bis(chloromethyl)oxetane and copolymers of 3,3-bis(chloromethyl)oxetane with at least one member of the group consisting of 3,3-disubstituted oxetanes other than 3,3-bis(chloromethyl)oxetane and oxetane, a plasticizer, and a phenolic compound of the group consisting of phenols, esters of said phenols, and ethers of said phenols in an amount from about 0.1% to about 10% by weight of said polymer as a heat and light stabilizer therefor, said phenols having at least one substituent radical of the group consisting of alkyl radicals having at least 4 carbon atoms, aryl radicals, and aralkyl radicals, said polymer having a specific viscosity of at least about 0.3 when measured as a 1% solution in cyclohexanone at 50° C.

6. As a new article of manufacture, a pelleted molding powder composition in accordance with claim 5 in which said polymer has a specific viscosity of at least about 0.5 when measured as a 1% solution in cyclohexanone at 50° C.

7. As a new article of manufacture, a pelleted molding powder composition in accordance with claim 5 in which said polymer has a specific viscosity of from about 0.8 to about 3 when measured as a 1% solution in cyclohexanone at 50° C.

8. As a new article of manufacture, a pelleted molding powder composition essentially consisting of a mixture of a polymer of the group consisting of homopolymers of 3,3-bis(chloromethyl)oxetane and copolymers of 3,3-bis(chloromethyl)oxetane with at least one member of the group consisting of 3,3-disubstituted oxetanes other than 3,3-bis(chloromethyl)oxetane and oxetane, a plasticizer, and from about 0.1% to about 10% by weight, based on said polymer, of 2,2-methylenebis(4-methyl-6-tertiary butylphenol) as a heat and light stabilizer therefor, said polymer having a specific viscosity of at least about 0.3 when measured as a 1% solution in cyclohexanone at 50° C.

References Cited in the file of this patent
UNITED STATES PATENTS

| | | |
|---|---|---|
| 2,514,210 | Albert | July 4, 1950 |
| 2,553,982 | Sarge | May 22, 1951 |
| 2,662,867 | Hoertz | Dec. 15, 1953 |
| 2,711,401 | Lally | June 21, 1955 |
| 2,730,436 | Young et al. | Jan. 10, 1956 |